Jan. 7, 1930.   C. L. KNAPP   1,742,357
WINDSHIELD WIPER
Filed July 13, 1928
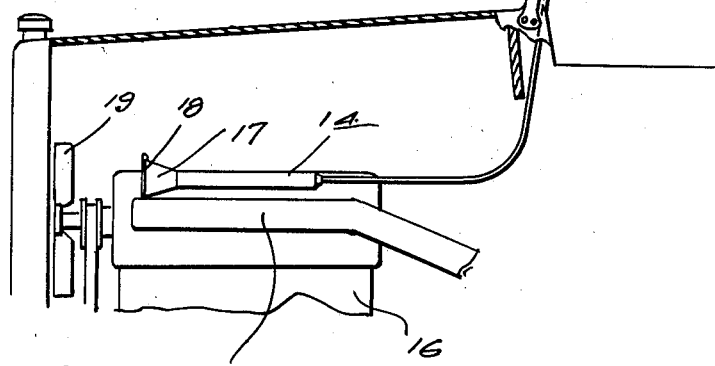
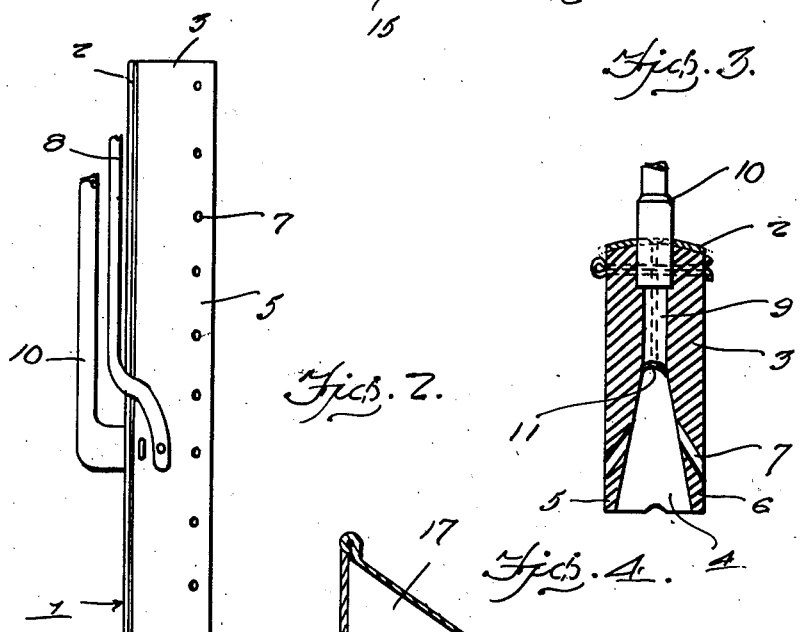
Inventor
C. L. Knapp
By Clarence A. O'Brien
Attorney Patented Jan. 7, 1930

1,742,357

UNITED STATES PATENT OFFICE

CHARLES L. KNAPP, OF SHENANDOAH, PENNSYLVANIA

WINDSHIELD WIPER

Application filed July 13, 1928. Serial No. 292,545.

The present invention relates to improvements in windshield wipers of the swinging or oscillatory type which operates through a limited arc on the outer surface of the windshield glass.

One of the important objects of the present invention is to provide a windshield wiper that includes a means for directing warm air against the outer surface of the glass for the purpose of melting snow or ice from the path of the windshield wiper, thus facilitating operation of the wiper and overcoming the common difficulty of wipers being clogged in snow or sleet storms.

A further object is to provide a windshield wiper wherein the same is formed with hot air discharge apertures, in the sides thereof, heated air being supplied to the wiper through the medium of a flexible hose having connection with a hot air chamber located over the exhaust manifold of the engine and which chamber is formed at its forward end with an enlarged funnel shaped cold air inlet mouth.

A further object is to provide a structure of the above mentioned character that can be readily and easily installed on an automobile without necessitating any material alterations, the device being at all times positive and efficient in its operation.

Still a further object is to provide a windshield wiper of the above mentioned character which is simple in construction, inexpensive, strong and durable, and further well adapted to the purpose for which it is designed.

Other objects of the invention will become apparent as the nature of the invention proceeds and when taken in connection with the accompanying drawing.

In the accompanying drawing, forming a part of this application, and wherein like reference characters designate like parts throughout the several views:

Figure 1 is a side elevation of the windshield wiper embodying my invention showing the same mounted on an automobile, and also disclosing the arrangement of the hot air chamber with respect to the exhaust manifold of an internal combustion engine.

Figure 2 is a detail view of the wiper.

Figure 3 is a sectional view through the wiper for more clearly disclosing the arrangement of the hot air discharge apertures, and Figure 4 is a sectional view, through the forward end portion of the hot air chamber showing the closure for the funnel shaped cold air inlet mouth.

In the drawing, wherein for the purpose of illustration is shown the preferred embodiment of my invention, the numeral 1 designates generally my improved windshield wiper, the same including a metallic back 2 and to which is secured the rubber body 3. The longitudinal free edge of the rubber body is formed with a substantially V-shaped pocket 4 that extends inwardly from said edge to the intermediate portion of the rubber body as clearly shown in Figure 3, whereby to form windshield glass engaging end portions 5 and 6, that constitute a double wiper which is active in both directions and each of the edge portions is formed with diagonally disposed hot air orifices or passages 7 that communicate at their inner ends with the V-shaped pocket 4, as also clearly shown in Figure 3 and the purpose of these apertures will be presently described.

The supporting arm for the wiper 1 is shown generally at 8, and is connected with the usual actuating means for the wiper, in the manner well known in the art, and as the actuating means for the wiper constitutes no part of the present invention, a detailed description of the same is believed unnecessary.

The rubber body 3 is formed with a hot air supply passage 9 that extends from the apex portion of the V-shaped pocket 4 to the back of the body at the intermediate portion thereof and the hot air supply pipe 10 has communication with this passage 9. Reinforcing strip of brass 11 is arranged within the apex portion of the V-shaped pocket 4 as shown in Figure 3.

The fitting 10 is swivelly connected at its upper end to a hot air delivery tube 12, as at 13, and this tube has communication at its other end with the rear end of the hot air chamber or cylinder 14, that is supported directly over the exhaust manifold 15 of an internal combustion engine 16, in any appropriate manner. A funnel shaped cold air inlet mouth 17 is arranged on the forward end of this hot air chamber or cylinder 14 and a hinged cover 18 is provided for this mouth 17 as clearly indicated in Figure 4.

The funnel shaped mouth 17 is positioned directly in rear of the fan 19, and in warm weather or whenever it is not snowy, the cover 18 is positioned over the mouth 17 as shown in Figure 4, so that warm air will not be supplied to the wiper 1. However, during a snow or sleet storm, while driving in such weather, the cover 18 is swung to an open position, so that cold air will rush into the mouth 17 and will pass through the chamber 14, where it is heated by reason of the exhaust pipe 15 and the heated air will pass through the tube 12 into the V-shaped pocket 4 of the wiper 1, and this heated air will be directed outwardly through the passages 7 against the outer surface of the windshield glass, so that any ice or snow formed on the glass will be melted that is within the path of the windshield wiper, thus facilitating the operation of the wiper and overcoming the difficulty of the wiper becoming clogged in snow or sleet storms as frequently occurs with the type of wipers now in use.

A windshield wiper of the above mentioned character can be manufactured at a very low cost and the same will at all times be positive and efficient in carrying out the purposes for which it is designed.

Furthermore, a heating device for association with a windshield wiper of this character may be installed on an automobile without necessitating any alterations of the parts with which the present invention is associated.

While I have shown the preferred embodiment of my invention, it is to be understood that various changes in the size, shape and arrangement of parts may be resorted to, without departing from the spirit of the invention or the scope of the appended claims.

I claim:

1. A device of the class described comprising a windshield wiper movable against and over the surface of a windshield and provided with hot air discharge apertures, a source of heated fluid supply, and means for conducting heated fluid from said source of supply to said apertures.

2. A device of the class described comprising a windshield wiper including a body provided with a hot air receiving chamber, the windshield glass engaging portions of the body being formed with hot air outlet apertures communicating with the hot air chamber, and means for supplying heated air to the chamber.

3. A device of the class described comprising a windshield wiper including a body provided with a hot air receiving chamber, the windshield glass engaging portions of the body being formed with hot air outlet apertures communicating with the hot air chamber, means for supplying heated air to the chamber, said means comprising a unit disposed adjacent the exhaust manifold of an internal combustion engine and provided at its forward end with a cold air inlet, and a heated air delivery tube extending from the other end of the unit and connected with the body of the wiper for communication with the hot air chamber therein.

4. A device of the class described comprising a windshield wiper including an elongated rubber body formed with a hot air receiving pocket that extends from a longitudinal edge of the body to an intermediate portion thereof, and windshield glass engaging edge portions on opposite sides of the hot air receiving pocket, said edge portions being formed with hot air discharge apertures that extend diagonally and communicate at their inner ends with said pocket, and means for supplying heated air to the pocket.

In testimony whereof I affix my signature.

CHARLES L. KNAPP.